US012645311B2

(12) United States Patent
Eberwein

(10) Patent No.: US 12,645,311 B2
(45) Date of Patent: Jun. 2, 2026

(54) CONTROL INPUT DEVICE FOR A CAPACITIVE TOUCH SCREEN

(71) Applicant: Nexteq PLC, West Sussex (GB)

(72) Inventor: Fabian Eberwein, Innsbruck (AT)

(73) Assignee: Nexteq PLC, West Sussex (GB)

( * ) Notice: Subject to any disclaimer, the term of this patent is extended or adjusted under 35 U.S.C. 154(b) by 0 days.

(21) Appl. No.: 18/858,576

(22) PCT Filed: Apr. 24, 2023

(86) PCT No.: PCT/GB2023/051082

§ 371 (c)(1),
(2) Date: Oct. 21, 2024

(87) PCT Pub. No.: WO2023/203358

PCT Pub. Date: Oct. 26, 2023

(65) Prior Publication Data

US 2025/0284352 A1     Sep. 11, 2025

(30) Foreign Application Priority Data

Apr. 22, 2022     (GB) ..................................... 2205923

(51) Int. Cl.
G06F 3/0362     (2013.01)
G06F 3/039     (2013.01)
G06F 3/044     (2006.01)

(52) U.S. Cl.
CPC .......... *G06F 3/0362* (2013.01); *G06F 3/0393* (2019.05); *G06F 3/044* (2013.01)

(58) Field of Classification Search
CPC ....... G06F 3/0362; G06F 3/0393; G06F 3/044
See application file for complete search history.

(56) References Cited

U.S. PATENT DOCUMENTS 6,492,978 B1     12/2002 Selig et al.
8,988,355 B2     3/2015 Solomon et al.
(Continued)

FOREIGN PATENT DOCUMENTS

DE     102019001842 A1     9/2020
EP     3112996 A1     1/2017
WO     2019182776 A1     9/2019

OTHER PUBLICATIONS

International Search Report and Written Opinion of corresponding PCT/GB2023/051082, dated Jul. 21, 2023. [19 pages].
(Continued)

*Primary Examiner* — Michael Pervan
(74) *Attorney, Agent, or Firm* — Leason Ellis LLP

(57) ABSTRACT

A control input device and system are disclosed. The control input device has a mounting base to a capacitive touch screen; an actuator supported by and electrically insulated from the base with an electrically conducting surface and further including: an electrode that is touching, or adjacent to, the capacitive touch screen when the base is mounted, an electrical circuit between the electrode and the electrically conducting surface, the electrically conducting surface having a surface area that is selected such that the electrically conducting surface provides capacitive coupling to, or approaching, infinity whereby capacitive coupling between the electrode and the capacitive touch screen is detectable by the capacitive touch screen's controller, wherein, in use, the electrode is configured to undergo a change corresponding to a state of the actuator and the controller of the touch screen can determine the state of the actuator from the change to the electrode.

15 Claims, 12 Drawing Sheets

(56)      References Cited

U.S. PATENT DOCUMENTS

| | | | | |
|---|---|---|---|---|
| 10,606,401 | B2 * | 3/2020 | Barel | G06F 3/0416 |
| 10,678,343 | B2 * | 6/2020 | Barel | G06F 3/0202 |
| 2006/0256090 | A1 | 11/2006 | Huppi | |
| 2012/0327013 | A1 | 12/2012 | Lee et al. | |
| 2013/0314375 | A1 | 11/2013 | Rickstrom et al. | |
| 2014/0247246 | A1 | 9/2014 | Maus | |
| 2018/0136738 | A1 | 5/2018 | Argiro | |
| 2019/0286247 | A1 * | 9/2019 | Barel | G06F 3/0393 |
| 2019/0391671 | A1 | 12/2019 | Pfau et al. | |
| 2020/0026387 | A1 * | 1/2020 | Barel | G06F 3/0393 |
| 2020/0117288 | A1 | 4/2020 | Lopez et al. | |

OTHER PUBLICATIONS

Examination Report for GB Application No. GB2305990.0 dated Jan. 23, 2026 (5 pages).

* cited by examiner

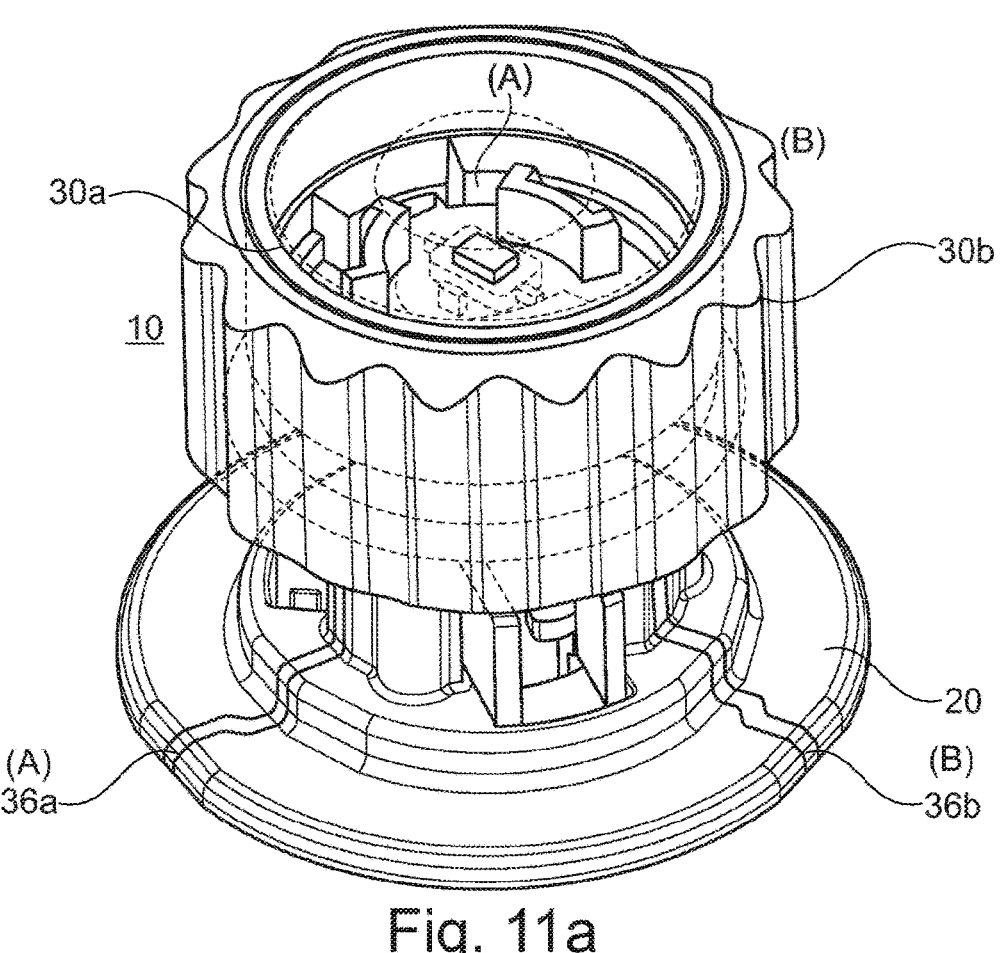
Fig. 11a
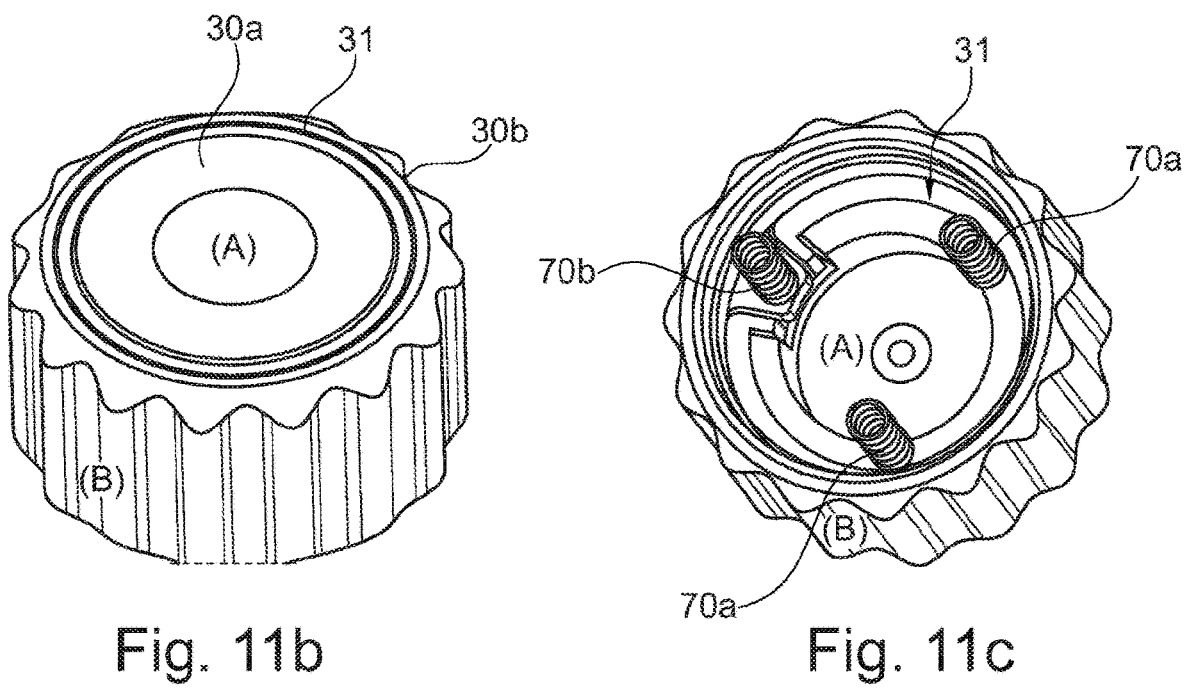
Fig. 11b
Fig. 11c

| -2 | -3 | -2 | -1 | -1 | 1 | -1 |
|----|----|----|----|----|----|----|
| -3 | -3 | -6 | 0 | 0 | -2 | -1 |
| 0 | -13 | -44 | 22 | -17 | 0 | 0 |
| -1 | -10 | -22 | 23 | -11 | -2 | 2 |
| -3 | -10 | -36 | 0 | -30 | -1 | 1 |
| -1 | 30 | 20 | -50 | 2 | -2 | -3 |
| -3 | -3 | -1 | -7 | 3 | -1 | 0 |
| -1 | -1 | -1 | -1 | -1 | 0 | -1 |

CONTROL INPUT DEVICE FOR A CAPACITIVE TOUCH SCREEN

CROSS-REFERENCE TO RELATED APPLICATIONS

This application is a U.S. National Stage Application under 35 U.S.C. § 371 of International Patent Application No. PCT/GB2023/051082, filed Apr. 24, 2023, which claims priority to Great Britain Patent Application No. 2205923.2, filed Apr. 22, 2022, the contents of which are each hereby incorporated by reference in their respective entireties.

FIELD OF THE INVENTION

The present invention related to control input devices for a capacitive touch screen that are particularly applicable for use in complex interfaces and those in which a user might be navigating only or primarily by touch.

BACKGROUND

Capacitive touch screens are an increasingly common input method for software and computer based systems across many industries and applications. They offer versatility, simplicity of operation, and compactness.

For complex operations such as audio mixing, however, there are a number of problems with the use of touch screen controls.

Firstly, manual operation of a touch screen is unable to provide the degree of precision of traditional controls such as potentiometers, shaft encoders, linear faders, and electromechanical switches.

Secondly, the lack of tactile feedback provided by a touch screen does not allow the development of motor memory, essential to enable a user to concentrate on complex tasks while interacting with the control interface.

There exist tactile switches for touch screens. Typically, they include an actuator, such as a switch or button, and a sensing electrode. The actuator has a user contact surface that is electrically connected to an electrode. When the actuator is pressed by a user the circuit is completed and connects the electrode to a touching finger, representing a ground, generating an input in the receiving software. However, switches alone can only provide so much functionality.

A further area where touch screens are desired to be used is in medical and industrial applications. Here, however, there is a further complication is that such environments may require users to wear protective gloves and the like. In such situations, conventional touch screens may not register the touch of a gloved individual properly or at all.

It is therefore desirable to provide other input mechanisms for touch screens as a means of interaction for complex operations, such as audio mixing, particularly a mechanism capable of providing precision control and tactile feedback.

STATEMENT OF INVENTION

According to an aspect of the present invention, there is provided a control input device for a capacitive touch screen, comprising:
- a base for mounting the device in place on the capacitive touch screen;
- an actuator, the actuator being supported by and electrically insulated from the base, the actuator having an electrically conducting surface and further including:

an electrode that is touching, or adjacent to, the capacitive touch screen when the base is in place; and, an electrical circuit between the electrode and the electrically conducting surface, the electrically conducting surface having a surface area that is selected such that the electrically conducting surface provides capacitive coupling to, or approaching, infinity whereby capacitive coupling between the electrode and the capacitive touch screen is detectable by the capacitive touch screen's controller, wherein, in use, the electrode is configured to undergo a change corresponding to a state of the actuator and the controller of the touch screen can determine the state of the actuator from the change to the electrode.

The actuator may include a switched connection wherein the switch is actuated by the actuator.

The actuation of the switch may be configured to modify the electrical circuit between the electrode and the electrically conducting surface and thereby cause the change.

The change may comprise disconnection of the electrically conducting surface from the electrode.

The electrical circuit may include a capacitive coupling between the electrode and the electrically conductive surface.

The electrical circuit may include an optoelectronic component configured to modify the electrical circuit in dependence on an optical signal received.

The actuator may be configured to control the exposure of light by the optoelectronic component from the touch screen when the control input device is mounted on the capacitive touch screen.

The electrode may change position relative to the touch screen surface during actuation, the change in position of the electrode being detectable by the touch screen controller.

The control input device may further comprise a first plurality of electrodes at respective predetermined positions on the capacitive touch screen, the control input device having a second plurality of electrodes positioned in a predetermined pattern, wherein actuation of the control input device causes a change in relative positioning of the first and second plurality of electrodes and a corresponding change in capacitance at the first plurality of electrodes that is detectable by the controller of the touch screen.

The control input device may be part of a system, the system including a lookup table mapping capacitance detected at the first plurality of electrodes to a position of the actuator. This may also be provided in some other way so as to be accessible to the controller of the touch screen.

According to another aspect of the present invention, there is provided a capacitive touch screen including:
- a controller; and,
- a control input device as described herein, the base of the control input device being mounted on the capacitive touch screen and the electrode of the control input device being configured to present capacitance at one or more predetermined positions on the touchscreen, wherein the controller is configured to scan the one or more predetermined positions for presented capacitance.

The controller may include control logic to determine the state of the actuator from presented capacitance.

The controller may include control logic to determine the state of the actuator from a value of presented capacitance.

The controller may include control logic to determine the state of the actuator from the position of presented capacitance on the touch screen.

The electrical circuit may simply be a permanent electrical connection between the electrically conducting surface and the electrode (such as in the slider/fader and knob examples below), it may be a switched connection (with the switch being actuated by actuation of the actuator such as the push-button example below) or some other circuit. The electrical circuit could alternatively be, or additionally include, a capacitive coupling between the electrode and the electrically conductive surface.

Embodiments of the present invention seek to provide high precision control input devices for use within the active display/touch area of an LCD, TFT or other display device so graphics and text can be located immediately adjacent to the control input device, and preferably also the area behind the control input device. Precision in this context covers parameters such as: resolution of movement of actuator, smoothness of tactile feel, and reliable detection of actuation.

To provide this precision and to solve the problem of tactile feedback through operational control objects, embodiments are directed to physical control input devices that are usable with conventional capacitive touch screen devices. Advantageously, these embodiments not only offer tactile feedback but that also can have a control input actuation detected without the presence of human capacitance through a skin touch. This feature means that the control input devices can be used by gloved individuals in medical environments, for example.

Embodiments are directed to control input devices that operate when mounted on capacitive touchscreen devices but do not need the human body grounding that would arise from a normal touch. The control input devices each have an electrically conducting surface that has an area such that it provides capacitive coupling to (or approaching such that it has the effect of being seen as) infinity. It will be appreciated that in an electrical sense, infinity is equivalent to the value of the environment/surrounding ground potential. As such, the conductive surface provides a virtual grounding effect. This virtual grounding effect means that it can take the place of a human touch (although will still work in presence of a human touch). Having the existence of the virtual grounding then enables different types of control input devices to be implemented that use the capacitive touch screen to signal actuation (but do not need a human touch that prior art approaches require).

Examples of the control input devices are set out below.

In one embodiment, the virtual ground is electrically connected by the electrical circuit to an electrode that changes position during actuation of the control input device (such as sliding of a slider, turning of a knob) and that change in position is detectable by the touch screen.

The use of a virtual ground means that the control input devices will work with or without human body grounding and therefore have greatly extended fields of use including medical and industrial applications where grounding contact from hands is inhibited/blocked by protective gloves and the like. Because the control input devices use virtual ground in place of grounding via human touch, this means that, advantageously, the electrically conductive surface does not necessarily have to be the surface that a user may touch when actuating the device. For example, the push button example below uses a transparent (and potentially non-conductive) material for the main button area such that imagery and the like from the touch screen is not obscured. This approach enables control input devices to have contact areas made of non-conductive materials and still be operational. One particular benefit of the electrically conductive surface being different to surfaces touched by a user is that it makes the control operation and resultant signal less dependent on external factors. Although it is described as a surface, it will be appreciated that the surface does not need to be exposed—an encapsulated body will have a surface.

The control input devices' respective electrode presents a capacitive charge that is detectable by the touch screen's sensor wiring and in turn enables the actuation or, where applicable, position of the control input device to be detected and through the capacitive touch screen's existing controller.

Advantageously, the electrode is configured to undergo a change corresponding to a state of the actuator. For example, the actuator may include a switched connection and the switching of the connection may modify the electrical circuit between the electrode and electrically conducting surface. This can be used to disconnect the electrically conducting surface, change the capacitance presented or possibly, where there are multiple electrodes or the electrode has multiple parts, it may change which electrode part presents the capacitance.

In addition to switching, other changes may include changes to a capacitive coupling. The electrical circuit might, for example include an adjustable capacitor or other electronic component that can be set, adjusted or otherwise controlled either by operation of the actuator or from an external source/signal. In the case of the variable capacitor, for example, the capacitor's electrodes could be physically moved during some operation of the actuator.

The change in capacitance may be used to improve resolution of detection of the presented capacitance by the touch screen's controller and/or it may also be detected separately, either in terms of moving location of the presented capacitance on the touch screen or by actually measuring the presented capacitance either by the touch screen's controller or by an external analogue to digital controller or a specialised touch screen controller that operates in parallel to that of the conventional touch screen.

In another advantageous embodiment (which may be combined with those above), the electrical circuit may include optoelectronic component(s) such as photodiodes or other optoelectronic detectors. In such embodiments, the touch screen can be used to communicate with the optoelectronic component(s) and cause a change in the electrical circuit (and therefore a change to the capacitance presented by the electrode). As will be appreciated, powering of the electrical circuit can be via the optoelectronic component instead of or in addition to the signalling.

In one embodiment, the display may be used as a constant light source. A shutter disc is coupled to the actuator so that the shutter disc causes an increasing and decreasing light beam towards an optoelectronic component (e. g. photodiode) which then makes or breaks the electrode(s) to virtual ground coupling. Multiple electrodes may be used to increase bus width. In another embodiment, the light from the screen may be directed to a photovoltaic component in the electrical circuit that in turn is used to power a controller which translates a relatively high frequent signal (eg. >120 Hz) of a mechanical quadrature encoder coupled to an action of the actuator (rotation for example) to a semi-absolute 1-n code that can be communicated from electrode(s) such as those described below using the virtual ground coupling.

In a further advantageous embodiment that may optionally be combined with features of embodiments outlined above, a first plurality of electrodes may be fixed at respective predetermined positions on the capacitive touch screen with the control input device having a second plurality of electrodes positioned in a predetermined pattern that at least partially align and move out of alignment with the first plurality of electrodes during actuation. For example, in the case of a rotary controller, the patterns move in and out of alignment such that the capacitance presented by the second plurality of the electrodes on the control input device can be detected by the touchscreen controller via the first plurality of electrodes. The value of capacitance presented at the various first electrodes is dependent on the relative position of the pattern, which changes as the controller rotates. A lookup table or similar can be provided and the capacitance values mapping to positions either provided or learnt by training and stored in the lookup table. When the touch screen controller needs to determine the position of the control input device, it obtains the capacitance at the first electrodes and uses the lookup table to obtain the position of the control input device.

It will furthermore be appreciated that the pattern of second electrodes connected to the electrically conducting surface can also be modified by approaches such as those described above. As such, a different pattern of active second electrodes could be presented depending on the mode of the control input device as set by the actuator and/or electrical circuit.

Modulation of signalling by the touch screen controller can optionally be used to improve coupling and signal detection between the control input device and touch screen controller and thereby improve identification of control actuations.

Embodiments enable capacitive touch screens to detect actuation with no human conduction. This allows actuation using covered hands, e.g., surgical gloves or via non-conductive objects. In at least selected embodiments, the electrode physically moves with respect to the touch screen surface and therefore a capacitive difference can be seen, created by a non-human component that has been optimised for capacitive effect.

The capacitance to infinity of a conducting sphere of radius r is:

$$C = 4\pi\varepsilon_0 r$$

For this equation to be valid requires the sphere to be isolated in the universe, so the potential of the surrounding field fall as $\phi \sim 1/R$ in every direction. The presence of a ground, or some grounded plane, anywhere close to the sphere will violate this condition, and affect the capacitance. It is possible to find an expression for the capacitance in this case. Embodiments approximate the capacitance to infinity (grounding potential) based on the formula above.

In preferred embodiments, the value of the capacitance of the electrically conductive surface is at least in the order of magnitude of the mutual capacitance of the touch screen's sensor grid. For example, in some touch screens this may be around 0.7 pF. This can be translated into a surface area of the sphere (using the equation above) and in turn enables the minimum surface area needed for the electrically conductive surface to be calculated. For tested, typical, capacitive touch screens, the radius of the sphere is around 5 mm and the minimum area is therefore around 200 mm². It will, however, be appreciated that the capacitance and signal to noise ratio when reading depends on factors such as sensitivity of the touch screen controller, configuration of the sensor grid etc. Smaller minimum areas are therefore likely, depending on properties of the touch screen used.

Embodiments apply this principle by incorporating a an electrically conductive surface that is a control input device part of a knob, button, fader, etc. and that when the control input device is mounted on a capacitive touch sensor has capacitance to, or approaching, ground. The so-called "virtual ground" is able to replace the human body grounding of a finger touch (but of course still operates if a finger touch is present).

BRIEF DESCRIPTION OF THE DRAWINGS

Embodiments of the present invention will now be described by way of example only and with reference to the accompanying drawings in which:

FIGS. 11a-11c are views of an embodiment based on the rotary control input device of FIG. 4; and, FIGS. 12a and 12b illustrate a further embodiment in which multiple electrodes are used to communicate state of the actuator.

DETAILED DESCRIPTION

Figure 1:
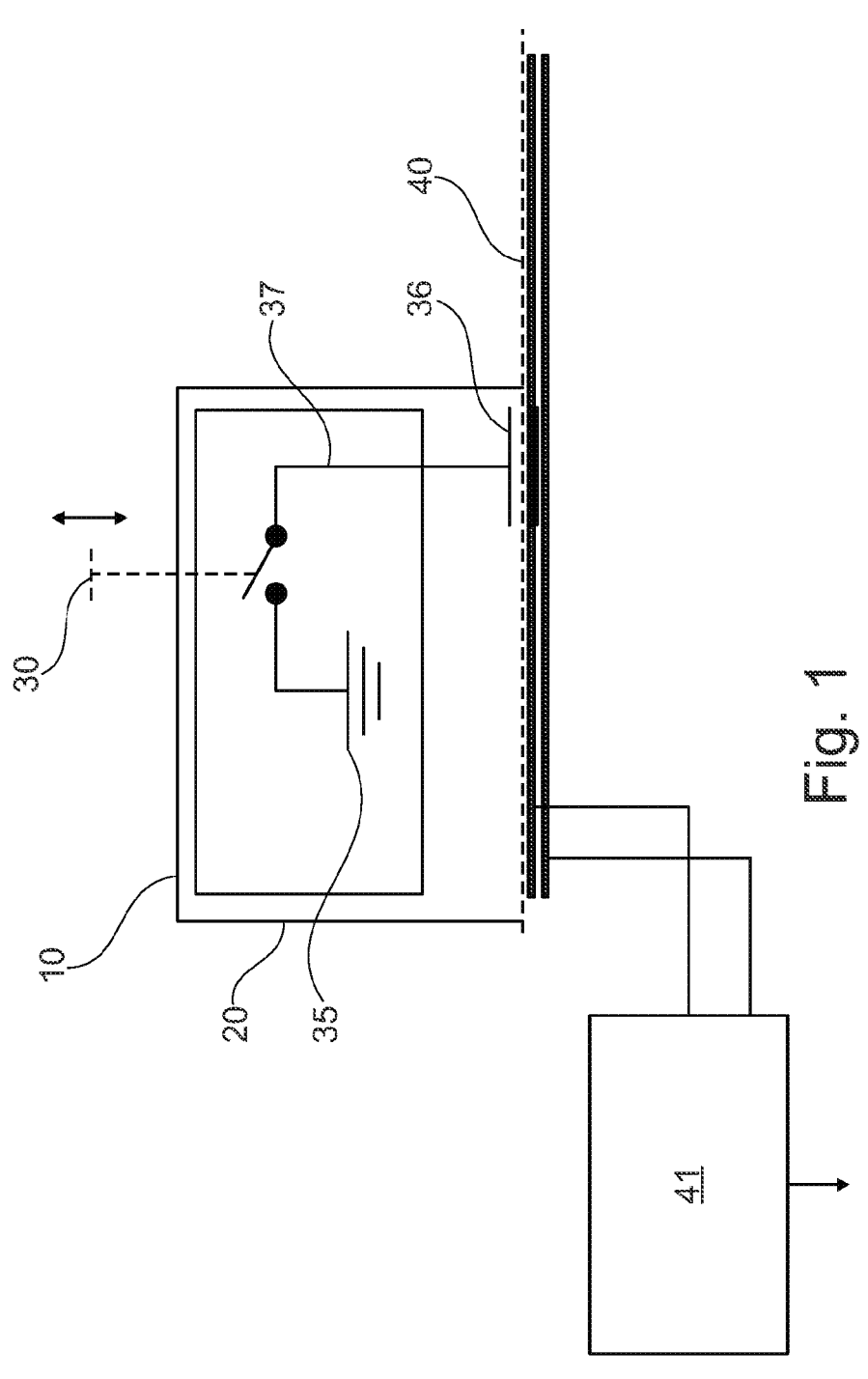
FIG. 1 is a schematic diagram illustrating aspects of a control input device according to an embodiment.

FIG. 1 is a schematic diagram of a control input device for a capacitive touch screen according to an embodiment.

The control input device 10 includes a base 20 for mounting the device in place on the capacitive touch screen 40.

The control input device 10 also includes an actuator 30. The actuator 30 is supported by, and electrically insulated, from the base 20. The actuator 30 includes an electrically conducting surface 35 and further includes an electrode 36 that is touching, or adjacent to, the capacitive touch screen 40 when the base 20 is in place.

An electrical circuit 37 connects the electrode 36 and the electrically conducting surface 35. The electrically conducting surface 35 has a surface area that is selected such that the electrically conducting surface 35 provides capacitive coupling to, or approaching, infinity. Capacitive coupling between the electrode 36 and the capacitive touch screen 40 is detectable by the capacitive touch screen's controller 41. The electrode 36 is configured to undergo a change corresponding to a state of the actuator 30. The controller 41 of the touch screen 40 can determine the state of the actuator 30 from the change to the electrode 36.

The control input device 10 can be implemented in many forms, examples of which are illustrated and described in the following embodiments. Additionally, not only can the form of the control input device vary (rotary, slider, pushbutton etc (or a control input device including combinations of these), the effect of the actuator 30 and the operation of the electrical circuit 37 can also vary between embodiments and/or change modes of operation of the embodiments. As such, it will be appreciated that the following embodiments are illustrative only and other combinations of features than those described and illustrated can also be achieved depending on the desired field of application of the control input device and the number and types of control inputs the designer wishes to provide.

Figure 2:
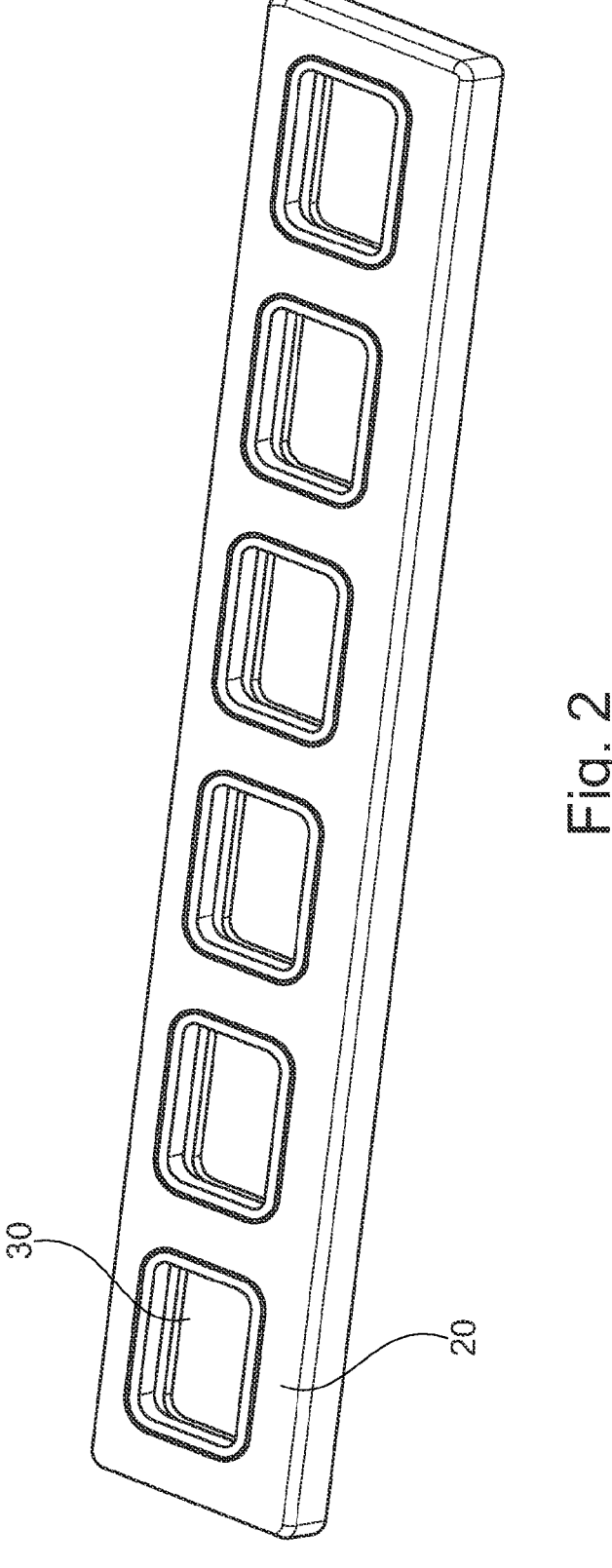
FIG. 2 is a perspective view of a button array in which each button is a control input device according to one embodiment.

FIG. 2 is a perspective view of a button array housed in a common base 20 in which each button 30 is a control input device according to one embodiment. It will be appreciated that a single button may be a control input device but also that control input devices can be scaled to incorporate many actuators.

Figure 3:
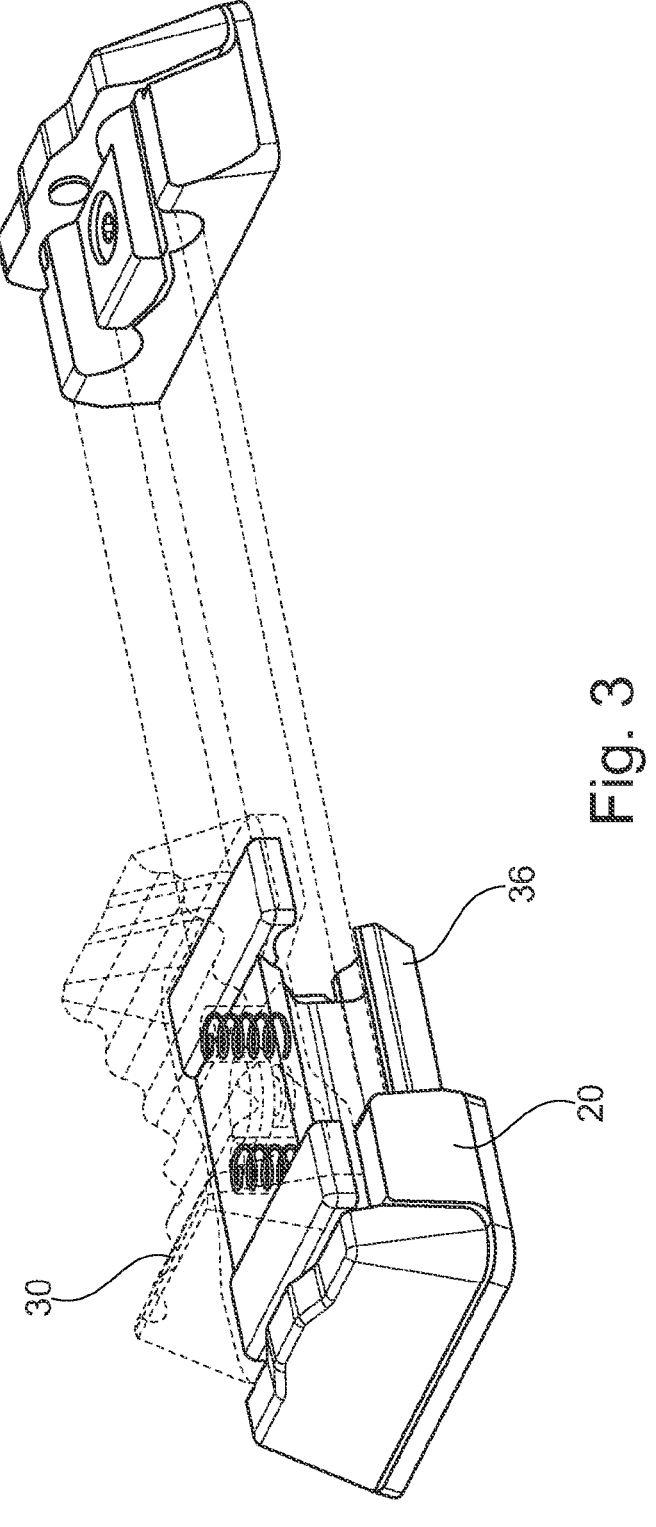
FIG. 3 is a perspective view of a slider control according to an embodiment.

FIG. 3 is a perspective view of a slider control that may be used as a fader, for example.

Figure 4:
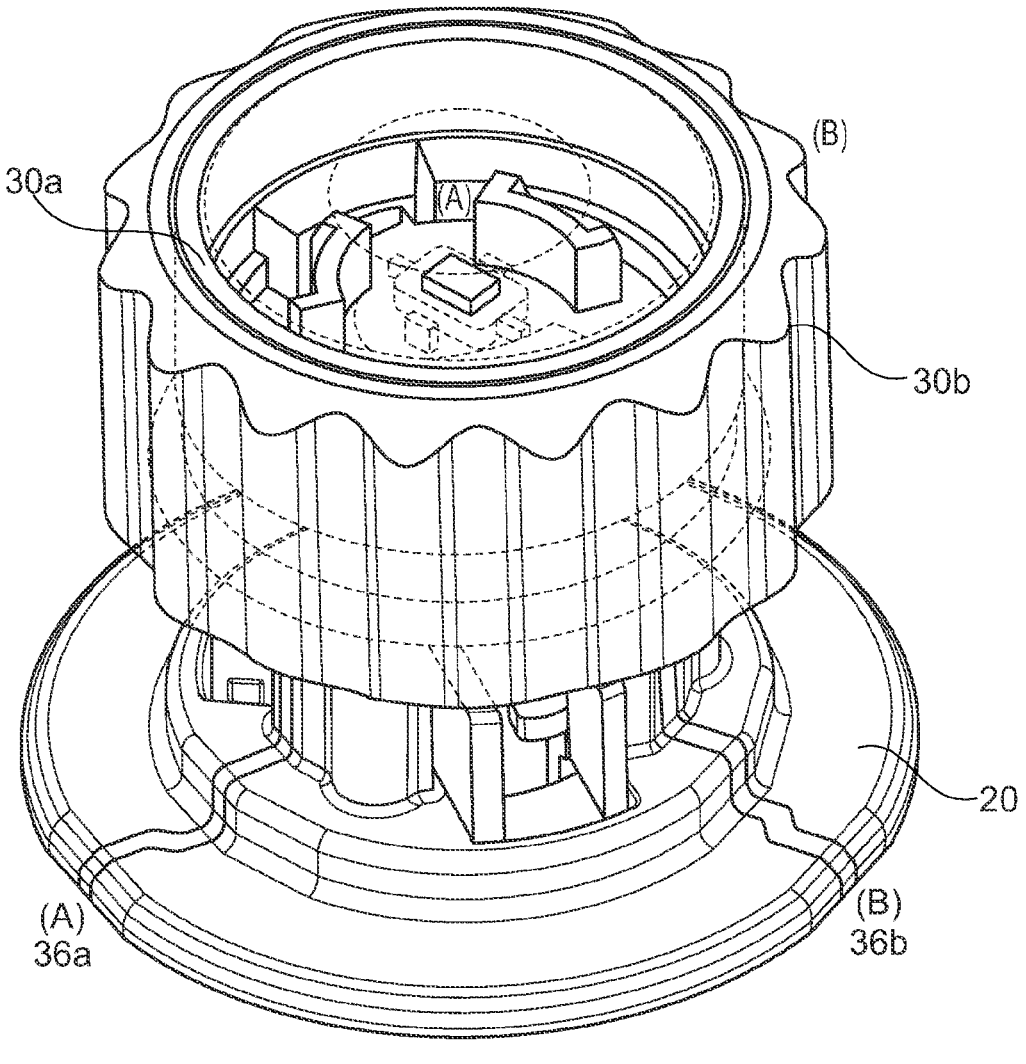
FIG. 4 is a perspective view of a rotary control according to an embodiment.

FIG. 4 is a perspective view of a rotary control according to another embodiment. In this embodiment, two different control actuators 30a, 30b are combined in the device and their status can be sensed via respective tracks labelled 36a and 36b on the base 20 to the touch screen.

Figure 5:
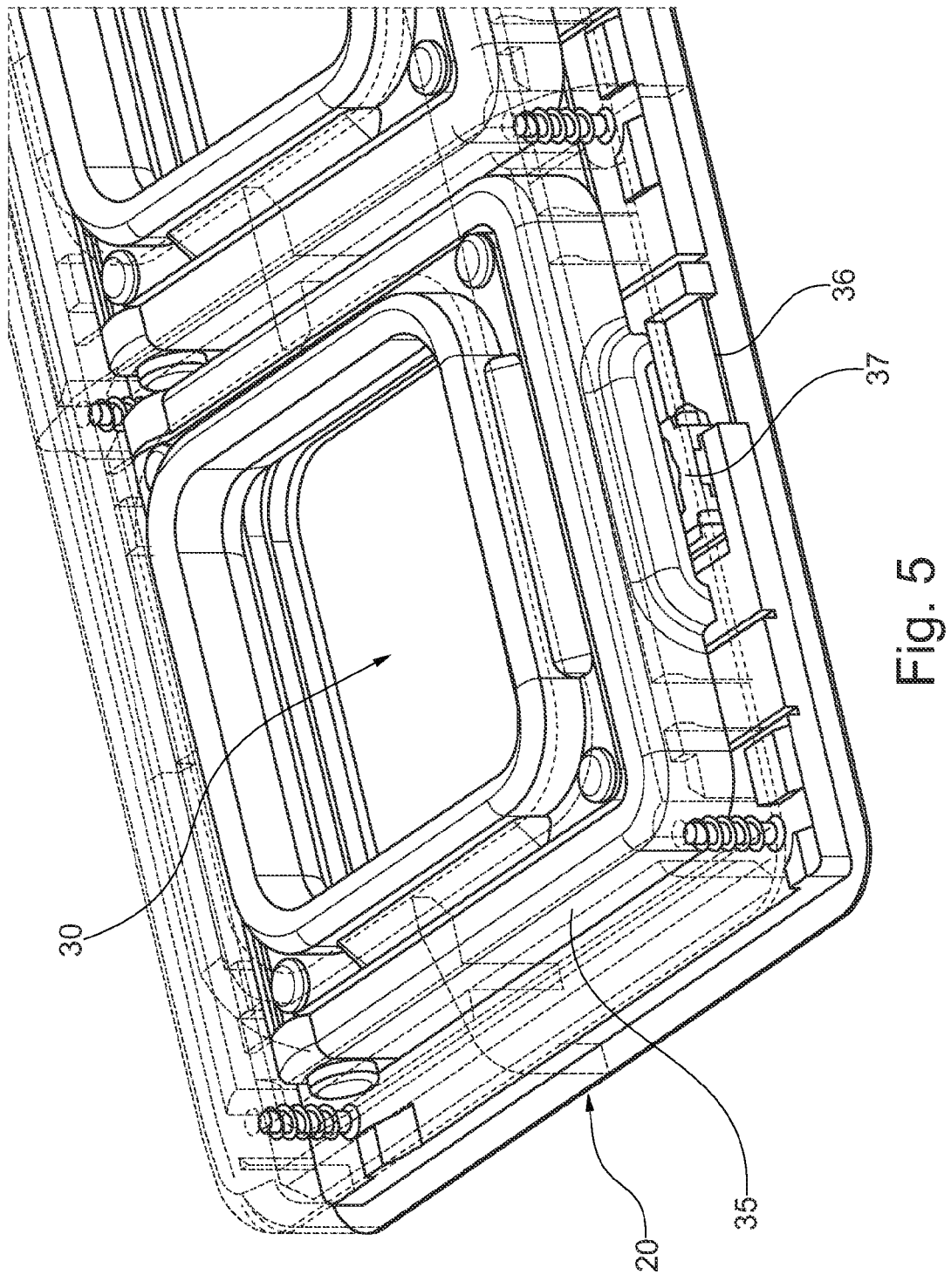
FIGS. 5-7 are views of an embodiment based on the control input device of FIG. 2 illustrating selected features in more detail.
Figures 6, 7:
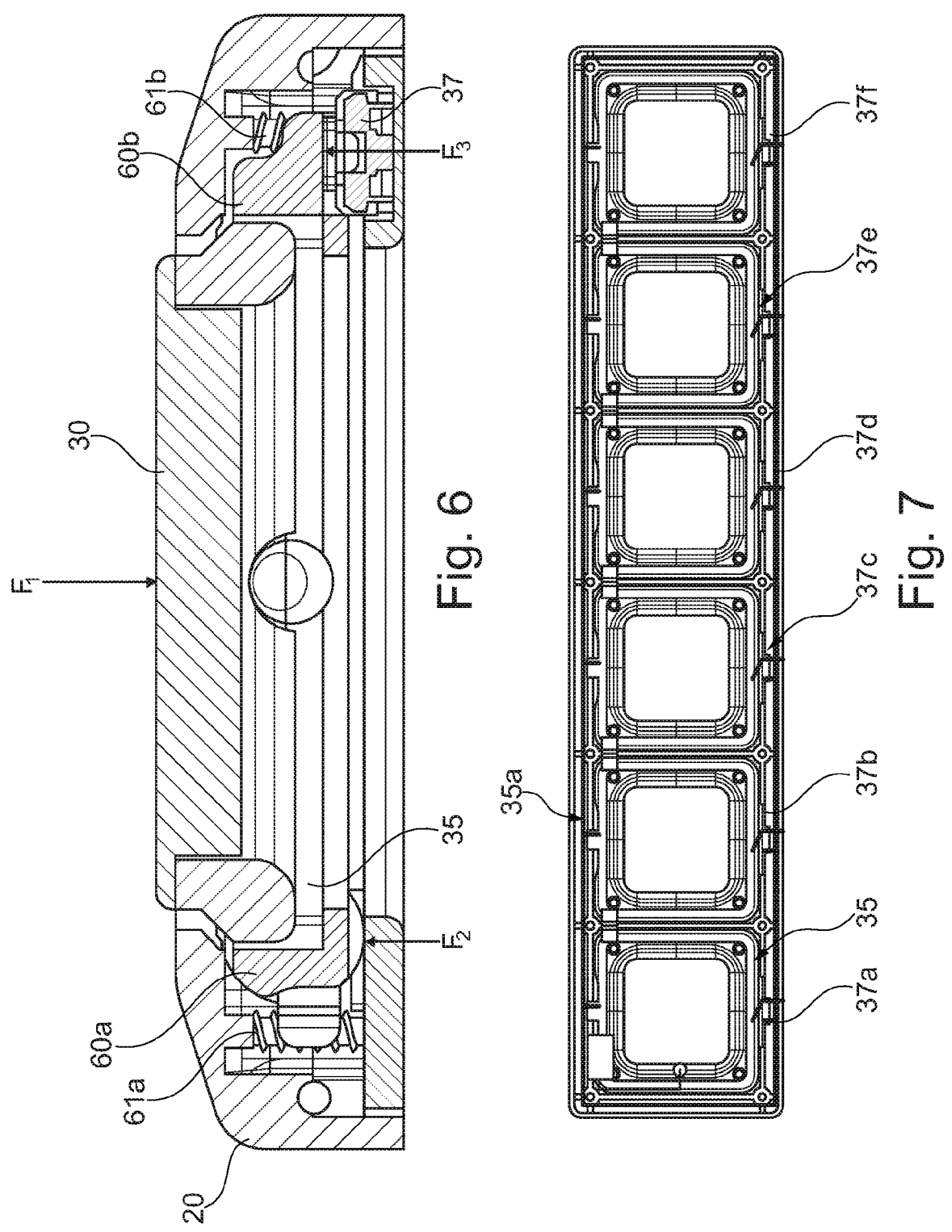

FIGS. 5-7—are views of an embodiment based on the control input device of FIG. 2 illustrating selected features in more detail.

In this embodiment, each control input device is a push-button 30. In the illustrated embodiment, an array of buttons are collectively housed in a common chassis (a base) 20. However, they may be individually packaged and used singularly.

As shown in FIG. 5, each button has an electrically conductive surface 35 in the form of an actuator frame. The actuator frame 35 mounts to the chassis 20. and provides capacitive coupling to, or approaching, infinity. An electrical circuit (in this embodiment in the form of a switched connection), connects the actuator frame 35 via a switch 37 to an electrode 36. The electrode 36 is adjacent to or in contact with the touch screen and is configured to present a change in capacitive charge to the touch screen when the switch is closed by pressing of the button.

When the button is pressed as shown in FIG. 6, a downward force $F_1$ is applied. In this embodiment, each button is floating within the chassis and include bearings 60a, 60b connected to sprung posts 61a 61b (preferably a bearing and sprung post in each corner of the button). The bearing 60a, 60b and corresponding springs 61a, 61b provide reaction forces $F_2$ and $F_3$ and direct the force to the switch 37 which in turn presses connects the actuator frame to the electrode 36.

Advantageously, due to positioning of the bearings and sprung posts, should a user depress the button off-centre, the reaction forces nevertheless still resolve as a downward force onto the switch 37.

The pressing of the button 30 completes the circuit by closing the switch 37. This causes a change in capacitance at the electrode 36 such that a controller of the touch screen can determine the state of the button.

Where multiple buttons are provided in an array as shown in FIG. 7, they may be connected via a connection 35a so they share a common electrically conductive surface 35 (frame). Alternatively, they may have separate electrically conductive surfaces 35. The advantage of a common surface 35 is a greater body mass to present the capacitive charge. In one embodiment, the common surface 35 may have reduced width etc so as to reduce the touch screen area obscured by the frame while at the same time maintaining sufficient conductive surface area to provide the virtual ground effect. As can be seen in FIG. 7, individual buttons have respective switches 37a-37f so that actuation of the buttons can be differentiated.

Figure 8:
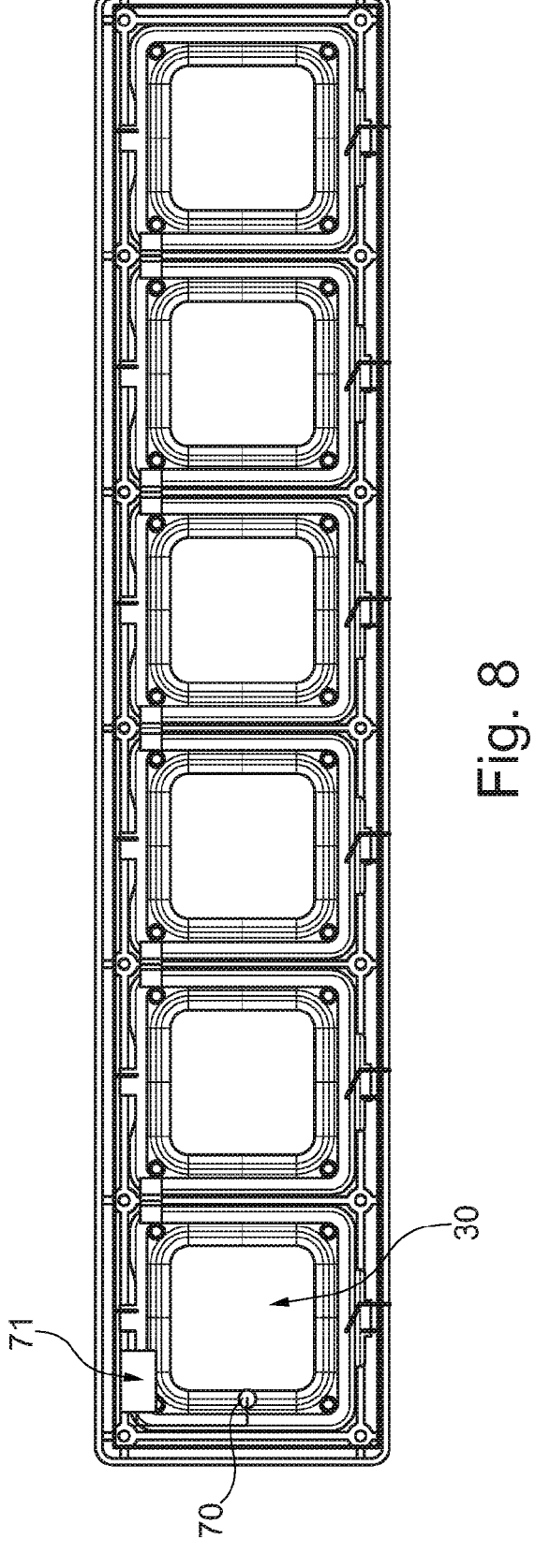
FIG. 8 is a view of an embodiment of a button array in which more than one actuation type is accommodated in a control input device.

As highlighted in FIG. 8, more than one actuation type can be accommodated in a control input device. In the illustrated embodiment, the button cap 30 (electrically separate to the frame and the part pressed by the user) may have a conductive coating or be made of a conductive material. In this embodiment, the button cap has a transparent, conductive, coating and is galvanically conductive and connected to a second set of electrodes 71 that can be sensed by the touch screen controller in the same way as other electrodes and provide touch sensing independently to the push operation.

Figure 9:
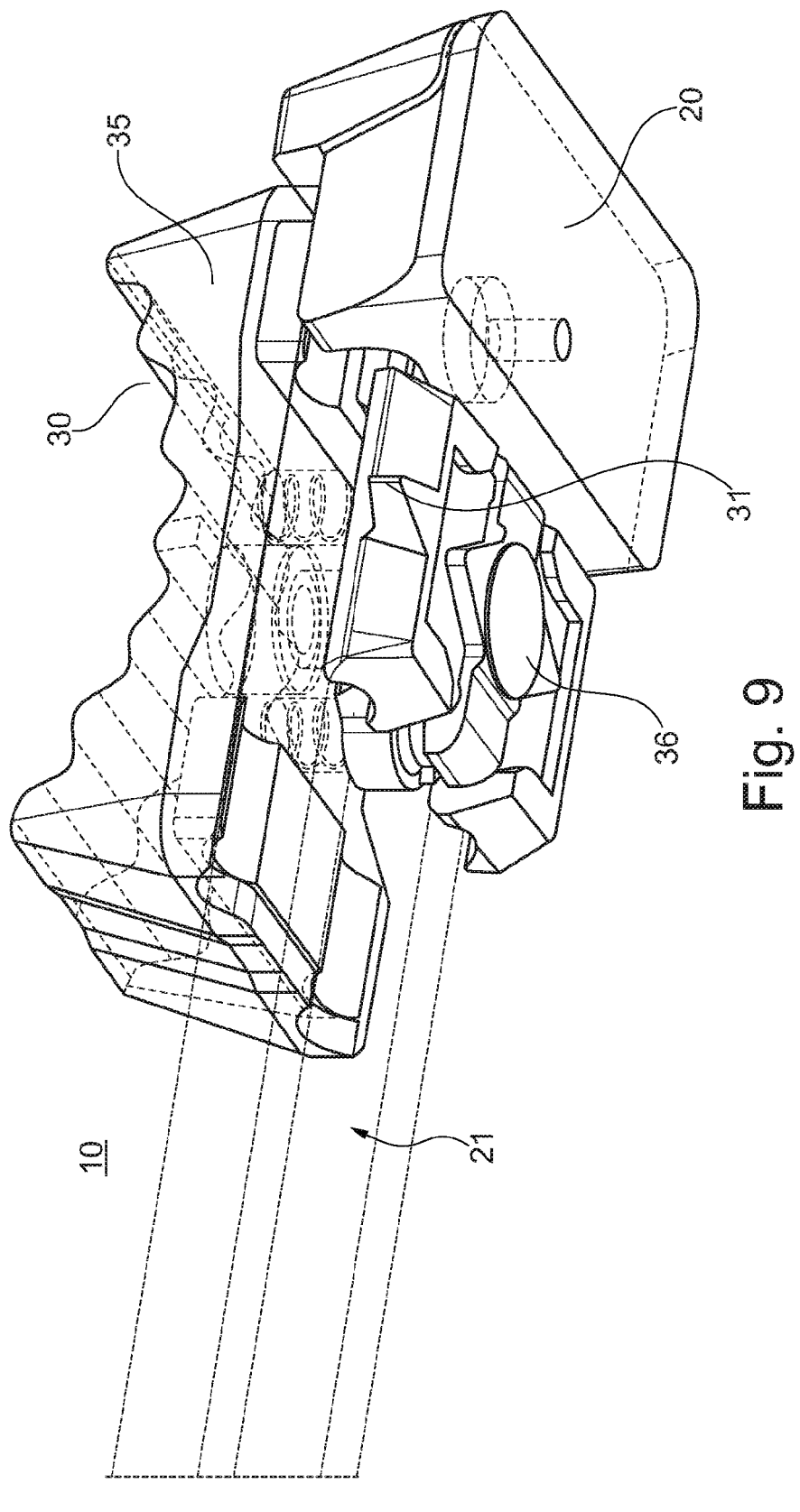
FIGS. 9 and 10 are views of an embodiment based on the slider-type control input device of FIG. 3 showing selected features in more detail.
Figure 10:
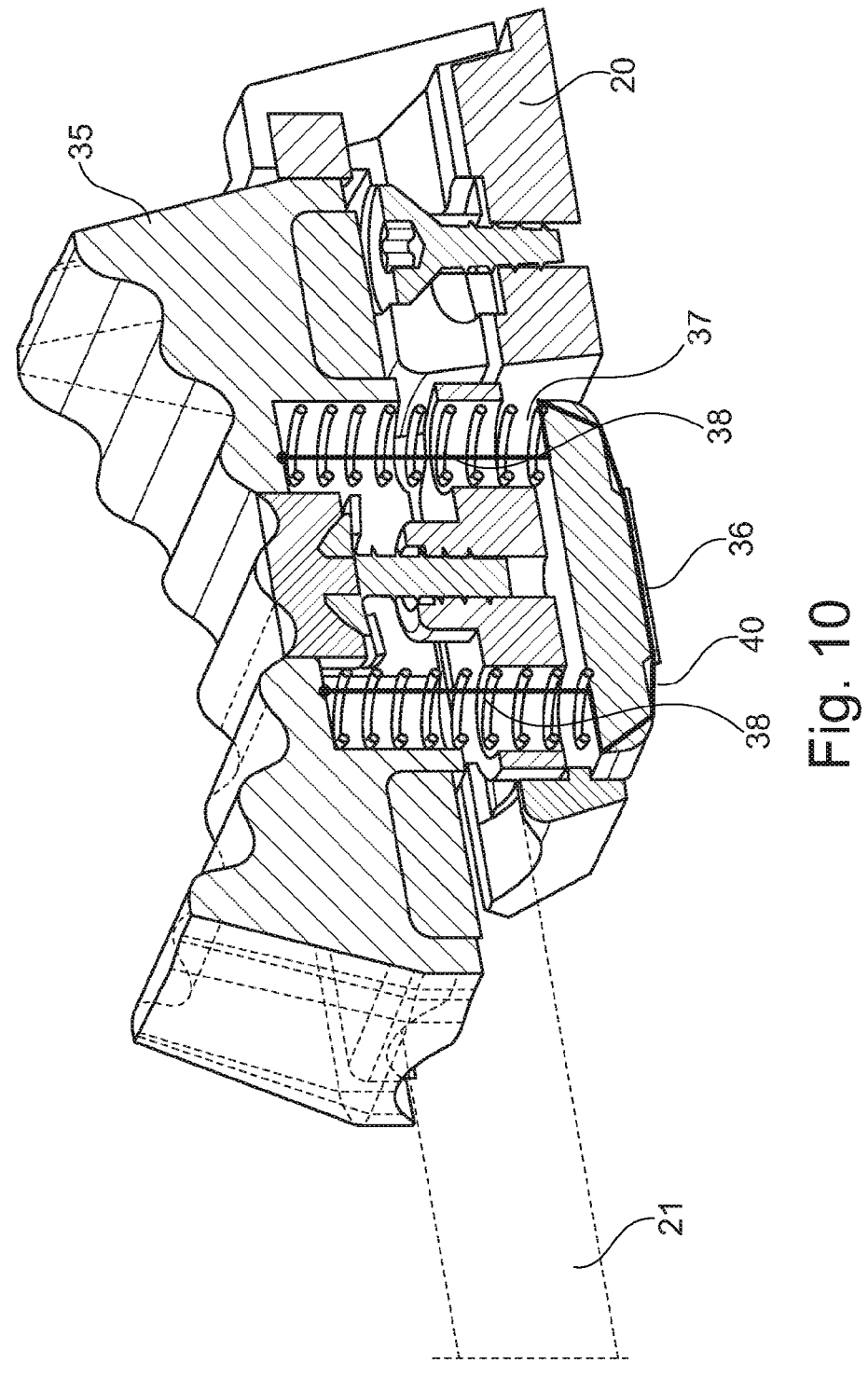

FIGS. 9 and 10 are views of the slider-type control input device of FIG. 3 showing selected features in more detail.

In this embodiment, the control input device is a slider-type control 10 (also known as a fader). The slider 10 includes an actuator 30 slidingly mounted on chassis (base) 20 (the slider rails 21 being part of the chassis 20).

The actuator 30 includes an electrode 36 that is positioned adjacent to, and moves relative to the surface of, the touch screen when the actuator moved along the rails 21 of the chassis 20.

As with the push-button arrangement above, the electrode 36 may be positioned adjacent to, or in contact with, the touch screen 40. In a preferred embodiment the actuator 30 in one embodiment may have a body 35 formed wholly or in part of aluminium and permanently galvanically connected to the electrode 36. Such an arrangement would mean that touches to the aluminium body 35 may be detectable (as the ground signal would increase). Additionally, the position of the slider can be determined by the touch screen controller due to position of the electrode 36. Optionally, the actuator may include a pointer 31 so as to provide a visual indicator as to positioning.

For ease of understanding, the connection 37 between the electrode 36 and body 35 is shown in FIG. 10, although it will be appreciated that this line is for illustration only and in practice the connection here is between the body 35, the springs 38 (also used to retain the actuator on the rails 21) and the electrode 36.

FIGS. 11a-11c show views of aspects of the rotary control input device of FIG. 4.

The rotary control input device 10 includes a mounting element (base) 20 for retaining the device in place on a capacitive touch screen and a circuit frame 30 rotatably mounted on the mounting element 20.

The circuit frame 30 has a conductive body that is electrically connected to a rotation electrode. In this embodiment there is an optional component—the circuit frame is divided into two parts, 30a and 30b, both of which are connected to respective (separate) electrically conducting surfaces, each having a surface area that is selected so as to provide capacitive coupling to, or approaching, infinity. The inner body portion 30a is in this embodiment conductive but is galvanically insulated from the external portion 30b by insulator 31. This enables rotation and push to be separately sensed by the touch screen at their respective electrodes 36a, 36b. In this embodiment, a spring 70a connects the inner part 30a to its electrode 36a and a corresponding spring 70b connects the outer part to its electrode 36b. As with prior embodiments, the conductive surface providing virtual ground means that neither the rotation nor the push actuation require a human ground to be detected at respective electrodes 36a, 36b.

Figure 12A:
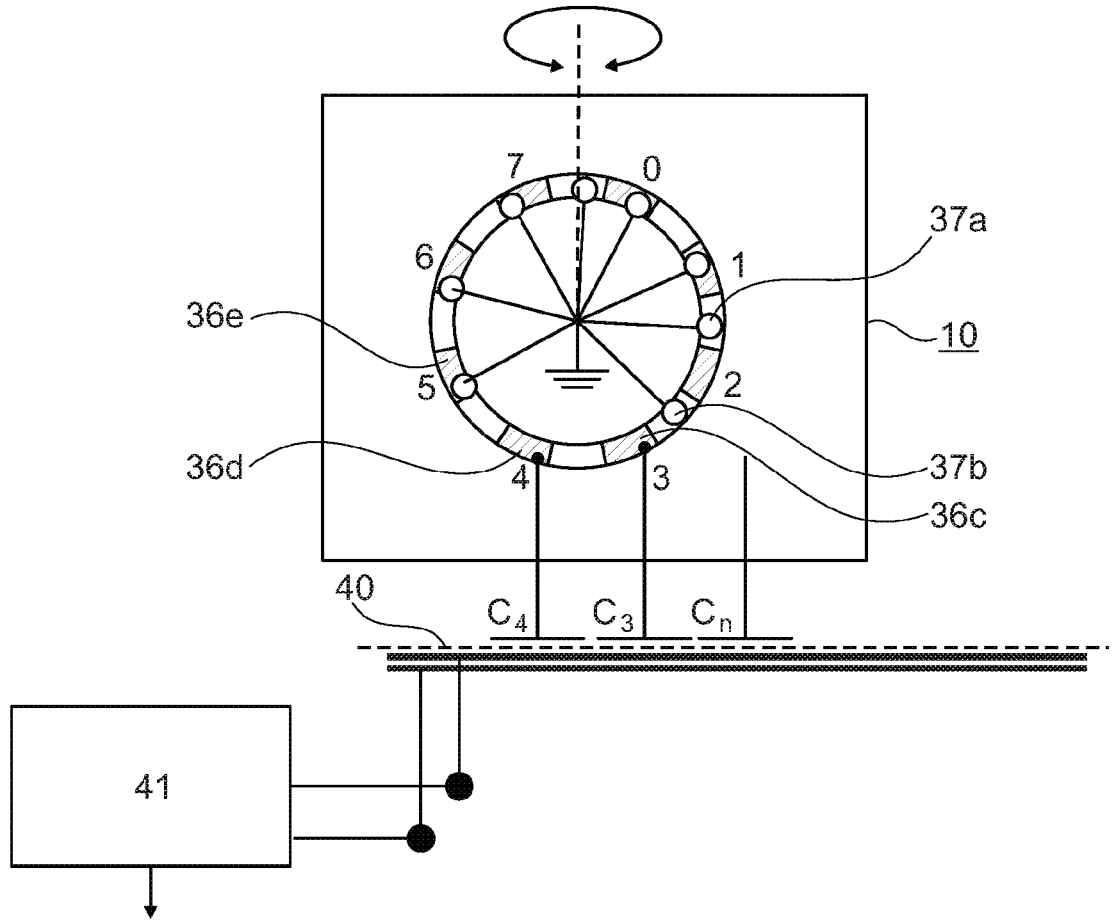

In the embodiments above, a single electrode at the capacitive touchscreen has been used for sending the state of the actuator. However, more complex arrangements are possible as illustrated in FIGS. 12a and 12b.

In this embodiment, a first plurality of electrodes (36*a* . . . *n*, although for simplicity of illustration only 36*c*, 36*d* and 36*e* are shown; again for simplicity only 36*c* and 36*d* show lines connecting to the touchscreen but all of the first plurality of electrodes are on the touchscreen) are fixed at respective predetermined positions on the capacitive touch screen 40. The control input device 10 has a second plurality of electrodes 37*a* . . . *h* that are part of the electrical circuit and positioned in a predetermined pattern that they at least partially align with the first plurality of electrodes at some during rotation but the alignment of respective electrodes differs at points during a full rotation. The pattern is selected such that as the control input device rotates about its fixed rotation axis (the control input device here being a knob type control input device), the second plurality of electrodes rotate in a plane substantially parallel to that of the touchscreen (and therefore the first plurality of electrodes) and as they rotate, they move in and out of alignment with the first plurality of electrodes. The numbers of first and second electrodes need not be the same.

In this example, the capacitance presented by the second plurality of the electrodes on the control input device can be detected by the touchscreen controller via the first plurality of electrodes. This is illustrated, by way of example only, in FIG. 12*b*. Here, it can be seen that electrodes 36*a* and 36*b* are positioned over various cells of the touchscreen. The value of capacitance presented at the cells corresponding to the electrodes is dependent on the relative position of the pattern of second electrodes, which changes as the controller rotates. A lookup table or similar may be provided and the capacitance values mapping to positions either provided or learnt by training and stored in the lookup table. When the touch screen controller 41 needs to determine the position of the control input device, it obtains the capacitance at the first electrodes and uses the lookup table to obtain the position of the control input device.

The illustrated arrangement enables an 8 bit gray code to be used, resolving positions to 128 unique codes. Such an arrangement can be possible, for example, using a 20 mm diameter area for the electrodes 36.

In addition or as an alternative to a lookup table, a learning and/or memory based system may be used to determine position from presented capacitance. For example, the controller may be told what the capacitance at various increments around the rotation axis would be and can track when these are presented and infer positions from last sensed known capacitance and optionally degree of capacitance difference from that compared to current values.

It will furthermore be appreciated that the pattern of second electrodes connected to the electrically conducting surface can also be modified by approaches such as those described above. As such, a different pattern of active second electrodes could be presented depending on the mode of the control input device as set by the actuator and/or electrical circuit.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A control input device for a capacitive touch screen, comprising:
   a base for mounting the device in place on the capacitive touch screen;
   an actuator, the actuator being supported by and electrically insulated from the base, the actuator having an electrically conducting surface and further including:
   an electrode that is touching, or adjacent to, the capacitive touch screen when the base is in place; and,
   an electrical circuit between the electrode and the electrically conducting surface,
   the electrically conducting surface having a surface area that is selected such that the electrically conducting surface provides capacitive coupling to, or approaching, infinity whereby the control input device, when mounted in place on the capacitive touch screen, has capacitance to or approaching ground and capacitive coupling between the electrode and the capacitive touch screen is detectable by a controller of capacitive touch screen,
   wherein, in use, the electrode is configured to additionally undergo a change corresponding to a relative position of the actuator wherein a change in relative position of the actuator causes a variable change in capacitance presented by the electrically conducting surface whereby the controller of the touch screen can determine the relative position of the actuator from the change to the electrode.

2. The control input device of claim 1, wherein the actuator includes a switched connection wherein the switch is actuated by the actuator.

3. The control input device of claim 2, wherein the actuation of the switch is configured to modify the electrical circuit between the electrode and the electrically conducting surface and thereby cause the change.

4. The control input device of claim 3, wherein the change comprises disconnection of the electrically conducting surface from the electrode.

5. The control input device of claim 1, wherein the electrical circuit includes a capacitive coupling between the electrode and the electrically conductive surface.

6. The control input device of claim 1, wherein the electrical circuit includes an optoelectronic component configured to modify the electrical circuit in dependence on an optical signal received.

7. The control input device of claim 6, wherein the actuator is configured to control the exposure of light by the optoelectronic component from the touch screen when the control input device is mounted on the capacitive touch screen.

8. The control input device of claim 1, wherein the electrode changes position relative to the touch screen surface during actuation, the change in position of the electrode being detectable by the touch screen controller.

9. The control input device of claim 1, further comprising a first plurality of electrodes at respective predetermined positions on the capacitive touch screen, the control input device having a second plurality of electrodes positioned in a predetermined pattern, wherein actuation of the control input device causes a change in relative positioning of the first and second plurality of electrodes and a corresponding change in capacitance at the first plurality of electrodes that is detectable by the controller of the touch screen.

10. A system comprising a control input device of claim 9 and further comprising a lookup table mapping capacitance detected at the first plurality of electrodes to a position of the actuator.

11. A capacitive touch screen including:

a controller; and, a control input device as recited in claim 1, the base of the control input device being mounted on the capacitive touch screen and the electrode of the control input device being configured to present capacitance at one or more predetermined positions on the touchscreen, wherein the controller is configured to scan the one or more predetermined positions for presented capacitance.

12. The capacitive touch screen of claim 11, wherein the controller includes control logic to determine the relative position of the actuator from presented capacitance.

13. The capacitive touch screen of claim 11, wherein the controller includes control logic to determine the relative position of the actuator from a value of presented capacitance.

14. The capacitive touch screen of claim 11, wherein the controller includes control logic to determine the relative position of the actuator from the position of presented capacitance on the touch screen.

15. A control input device for a capacitive touch screen, comprising:

a base for mounting the device in place on the capacitive touch screen;

an actuator, the actuator being supported by and electrically insulated from the base, the actuator having an electrically conducting surface and being moveable relative to the base from one relative position to another, the actuator further including:

an electrode that is touching, or adjacent to, the capacitive touch screen when the base is in place; and, an electrical circuit between the electrode and the electrically conducting surface, wherein the electrically conducting surface of the actuator provides a capacitive coupling to, or approaching, infinity when mounted in place on the capacitive touch screen, and wherein movement of the actuator presents a variable capacitance detectable by a controller of the touch screen to determine the position of the moveable actuator.

* * * * *